US012799027B2

(12) United States Patent
Abdul-Kader et al.

(10) Patent No.: US 12,799,027 B2
(45) Date of Patent: Nov. 17, 2026

(54) THERMALLY INSULATING FABRIC

(71) Applicants: MICROTHERM NV, Sint Niklaas (BE); PRTC NV, Tisselt (BE)

(72) Inventors: Oras Abdul-Kader, Sint Niklaas (BE); Jan Demeulenaere, Kontich (BE)

(73) Assignees: Microtherm NV, Sint Niklaas (BE); PRTC NV, Tisselt (BE)

( * ) Notice: Subject to any disclaimer, the term of this patent is extended or adjusted under 35 U.S.C. 154(b) by 940 days.

(21) Appl. No.: 17/281,407

(22) PCT Filed: Oct. 11, 2019

(86) PCT No.: PCT/EP2019/077592

§ 371 (c)(1),
(2) Date: Mar. 30, 2021

(87) PCT Pub. No.: WO2020/074700

PCT Pub. Date: Apr. 16, 2020

(65) Prior Publication Data

US 2022/0048815 A1 Feb. 17, 2022

(30) Foreign Application Priority Data

Oct. 11, 2018 (EP) .................................... 18199863

(51) Int. Cl.

| | |
|---|---|
| ***C03C 25/007*** | (2018.01) |
| ***B32B 5/02*** | (2006.01) |
| ***B32B 5/26*** | (2006.01) |
| ***D06M 11/79*** | (2006.01) |
| ***E04B 1/78*** | (2006.01) |
| ***E04D 13/16*** | (2006.01) |

(52) U.S. Cl.

CPC ............ *C03C 25/007* (2013.01); *B32B 5/022* (2013.01); *B32B 5/265* (2021.05); *D06M 11/79* (2013.01); *E04B 1/78* (2013.01); *E04D 13/16* (2013.01); *B32B 2250/20* (2013.01); *B32B 2260/021* (2013.01); *B32B 2260/04* (2013.01); *B32B 2262/02* (2013.01); *B32B 2262/101* (2013.01); *B32B 2262/105* (2013.01); *B32B 2264/1021* (2020.08); *B32B 2307/304* (2013.01); *B32B 2307/306* (2013.01); *B32B 2307/73* (2013.01); *B32B 2419/00* (2013.01); *D06M 2200/12* (2013.01)

(58) Field of Classification Search

CPC ....... C03C 25/007; B32B 5/265; B32B 5/022; E04B 1/78; E04D 13/16

USPC .............................................................. 442/76

See application file for complete search history.

(56) References Cited

U.S. PATENT DOCUMENTS

2018/0022059 A1* 1/2018 Dill ......................... B32B 15/14 442/180

FOREIGN PATENT DOCUMENTS

| | | | | |
|---|---|---|---|---|
| DE | 102010005800 A1 * | 7/2011 | | C04B 30/00 |
| JP | 5615514 B2 * | 10/2014 | | |
| KR | 2013-0116632 A | 10/2013 | | |
| WO | 2006/097668 A1 | 9/2006 | | |
| WO | 2009/093002 A2 | 7/2009 | | |

OTHER PUBLICATIONS

Machine translation of DE102010005800 (Year: 2011).*
Translation of JP2009299893A (Year: 2009).*

* cited by examiner

*Primary Examiner* — Vincent Tatesure

(74) *Attorney, Agent, or Firm* — Dilworth & Barrese, LLP.; Michael J. Musella, Esq.

(57) ABSTRACT

Thermally insulating fabric comprising a textile fabric layer which comprises fumed silica powder of average pore size 50 to 200 nm in an amount range of 1 to 70% w.

16 Claims, No Drawings

THERMALLY INSULATING FABRIC

FIELD OF THE INVENTION

The present invention relates to a thermally insulating fabric, to a method to provide such fabric and to the use of such fabric for thermal insulation of various products.

BACKGROUND OF THE INVENTION

Aerogel is known nowadays for its excellent thermal insulation properties, particularly at room temperature.

Cloths being filled with such aerogels thereby providing cloths suitable for thermal insulation, are known from e.g. WO 2017/220577 A1. WO 2017/220577 describes a thermally insulating cloth having a layered structure comprising at least three layers, a first and a second outer textile layer providing the outer surfaces of said cloth, said outer textile layers being laminated to an intermediate layer comprising a textile fabric comprising aerogel powder.

Cloths made with such aerogels suffer from dust development during production, installation and use. Also the provision of said outer textile layers may lead to a less intimate contact between the cloth and the product to be insulated, for example, pipes. Further cloths made with such aerogels have limited applicability and are suitable only at temperatures below 300 °C.

SUMMARY OF THE INVENTION

It is an object of the present invention to provide an alternative thermally insulating fabric which suffers less of dust development, which can be used at higher temperatures and which can be easily installed around and provides good contact with the product to be insulated.

According to a first aspect of the invention, a thermally insulating fabric is provided. The thermally insulating fabric comprises a textile fabric layer which comprises fumed silica powder of average pore size 50 to 200 nm in an amount range of 1 to 70% w.

By using fumed silica instead of aerogel in the thermally insulating fabric according to the present invention the problem of dust development is eliminated or at least diminished even without outer textile layers being present. Further fumed silica remains stable at much higher temperatures than aerogel (up to 1000 °C) and is available at a much lower cost than aerogels.

DESCRIPTION OF ILLUSTRATIVE EMBODIMENTS

The above and other characteristics, features and advantages of the present invention will become apparent from the following detailed description. This description is given for the sake of example only, without limiting the scope of the invention.

The present invention will be described with respect to particular embodiments. It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

The independent and dependent claims set out particular and preferred features of the invention. Features from the dependent claims may be combined with features of the independent or other dependent claims, and/or with features set out in the description above and/or hereinafter as appropriate.

The pore size of the fumed silica powder for use according to the present invention is between 50 and 200 nm on average, such as between 50 and 100 nm and preferably between 50 and 70 nm.

Pores within fumed silica are generally located between the primary particles (inter-particle pores), not within the primary particles themselves (intra-particle pores).

The pore size can be measured and analysed by gas adsorption/desorption. Gas adsorption analysis is commonly used for surface area and porosity measurements. This involves exposing solid materials to gases or vapors at a variety of conditions and evaluating either the weight uptake or the sample volume. Analysis of these data provides information regarding the physical characteristics of the solid including skeletal density, porosity, total pore volume and pore size distribution. Usually nitrogen gas is used for the pore size determination of fumed silica. Pore size measurement is generally carried out according to standard ISO 15901-2.

The % w of the fumed silica powder is based upon the weight of the textile fabric layer in which it is present.

More preferred, the thermally insulating fabric comprises a textile fabric layer, which comprises fumed silica powder in an amount range of 15 to 50% w, such as in a range of 40 to 50% w.

The fumed silica content of the thermally insulating fabric according to the invention may be more than or equal to 20 $kg/m^3$, more preferably more than or equal to 50 $kg/m^3$ such as in the range of 50 to 80 $kg/m^3$, e.g. about 50 $kg/m^3$ or about 60 $kg/m^3$ or about 70 $kg/m^3$.

The fumed silica within the textile fabric layer is preferably uniformly distributed over the surface and/or the thickness of the textile fabric layer.

The fumed silica preferably is hydrophobic and causes no corrosion under insulation (CUI).

The fumed silica powder for use according to the present invention may be any fumed silica with an average pore size within the above ranges.

Preferably the fumed silica for use according to the invention has a surface area in the range 50 to 380 $m^2/g$, preferably 100 to 300 $m^2/g$, most preferably about 200 $m^2/g$. The specific surface area is generally determined on the basis of the BET method (Brunauer, Emmett and Teller) according to standard ISO 9277.

Fumed silica, also known as pyrogenic silica because it is produced in a flame, consists of microscopic droplets of amorphous silica (the primary particles) fused into branched, chainlike, three-dimensional secondary particles (aggregates) which then agglomerate into tertiary particles, resulting in a fluffy powder. The resulting powder has an extremely low bulk density and high surface area. Primary particle size is generally 5 to 50 nm. The particles are non-porous and generally have a surface area of 50 to 600 $m^2/g$. The bulk density is generally 30 to 100 $kg/m^3$, preferably 40 to 60 $kg/m^3$, such as about 60 $kg/m^3$.

Fumed silica is made from flame pyrolysis of silicon tetrachloride or from quartz sand vaporized in 3000 °C electric arc. Major global producers are Evonik (who sells it under the name AEROSIL), Cabot Corporation, Wacker Chemie, Dow Corning, Heraeus, Tokuyama Corporation, OCI, Orisil and Xunyuchem.

The fumed silica for use in the present invention is preferably a hydrophobic fumed silica.

Hydrophobic fumed silica's are produced by chemical treatment of the hydrophilic grades obtained directly from the flame hydrolysis and having freely accessible silanol groups (Si—OH) on the particle surface with hydrophobic property-imparting agents such as silanes, silazanes or siloxanes (e.g. halogen silanes, cyclic dimethylsiloxane). Hydrophobic fumed silicas are characterized by a low moisture adsorption. Also they are especially suitable for corrosion protection of e.g. the pipes to be insulated.

The hydrophobic fumed silica powder preferably has a hydrophobic agent content of between 1 and 15% w, preferably between 1 and 5% w, most preferably between 1 and 3% w, the % w based upon the total weight of the fumed silica powder. The hydrophobic agent content is generally also being referred to as silane content; the silane content as used herein meant to include the content of any organic derivative of a silicone containing at least one covalent silicon-carbon bond such as silane-based compounds, siloxane-based compounds and silazane-based compounds.

Preferably the silane content is kept low so as to keep combustibility low.

Thermal insulation fabrics containing fumed silica powder according to the present invention generally obtain a Euroclass A1 performance in the non-combustibility test ISO 1182 whereas thermal insulation fabrics containing aerogel generally only obtain a A2 classification due to the much higher silane content of aerogels (generally above 15% w, such as 20% w).

Suitable hydrophobic fumed silica's for use according to the present invention include the following products, commercially available from Evonik under the tradename AEROSIL: R 972, R 974, R 104, R 106, R 202, R 208, R 805, R 812, R 812 S, R 816, NAX 50, NY 50, RX 200, RX 300, RX 50, RY 200, RY 200 L, RY 200 S, RY 300, RY 50, NX 90 G, NX 90 S, NX 130. Other suitable hydrophobic fumed silica's are commercially available from Wacker under the tradename HDK such as H13L, H15, H17, H18, H20, H2000, H20RH, H30, H30LM, H30RM.

Further the hydrophobic fumed silica's available from OCI Company under the tradename KONASIL, e.g. K-P15, K-P20, K-D15, K-T30 and K-T20. Hydropbic fumed silica's are also available from Tokuyama under the tradename REOLOSIL (e.g. DM-10).

Particularly AEROSIL R 974 and RX 200 are preferred. AEROSIL R 974 is a hydrophobic fumed silica of specific surface area 150-190 $m^2/g$ after treated with dimethyldichlorosilane based on a hydrophilic fumed silica with a specific surface area of 200 $m^2/g$.

Instead of adding a hydrophobic fumed silica as such to the textile fabric layer the hydrophobization of the fumed silica can also take place once the fumed silica is added to the textile fabric layer e.g. by sprinkle coating with silicones or using the technique as described in EP 2622253.

According to some embodiments, the fumed silica powder may have a thermal conductivity at room temperature of less than 30 mW/m*K. This thermal conductivity is measured according to ASTM C518. The fumed silica powder may have a thermal conductivity in the range of 22 to 25 mW/m*K.

Adding infrared opacifiers such as suitable titanium dioxide, Zircon, Ilmenite, Zirconia, clays, graphite, carbon black, silicon carbide, iron oxide or magnetite powders allows to reduce the thermal conductivity of the fumed silica even more, especially at higher temperatures such as at more than 300 °C or more than 500 °C.

A preferred IR opacifier is silicon carbide. Preferably the particle size of the IR opacifier is in the range 2 to 7 μm.

This IR opacifier or mixture of IR opacifiers is generally added in an amount of up to 20% w, preferably up to 10% w, most preferably in the range of 3 to 7% w, the % w based upon the weight of the fumed silica present.

Further additives for the textile fabric layer include flame retardants such as flame retardant minerals, e.g. AlOH, MgOH, $MgCO_3 \cdot 3H_2O$ or any hydrated minerals (synthetic or natural) with endothermic nature or zinc borates, or functional mineral additives such as sound absorbers, or combinations of those.

The textile fabric layer of the present thermally insulating fabric containing the fumed silica is generally a flexible material consisting of a network of fibres and is preferably pliable around a tubular object having a bending radius of 1.5 inch (3.81 cm) or less.

According to some embodiments, the textile fabric layer may have a thickness in the range of 5 to 40 mm, preferably 5 to 20 mm, most preferably about 10 mm. Thickness is measured herein according to ISO 9073, using 0.5 kPa pressure.

The textile fabric may comprise a woven, nonwoven, kitted or braided textile fabric.

According to some embodiments, the textile fabric layer may comprise a nonwoven textile fabric.

According to some embodiments, the textile fabric prior to the addition of the fumed silica may have a density in the range of 100 to 180 $kg/m^3$, preferably in the range of 110 to 150 $kg/m^3$, such as in the range of 110 to 130 $kg/m^3$, e.g. about 110 to 120 $kg/m^3$. The density of the textile layer containing the fumed silica will generally be in the range 160 to 260 $kg/m^3$.

According to some embodiments, the textile fabric may have a surface weight of 1000 to 1800 $g/m^2$, such as in the range of 1100 to 1800 $g/m^2$, more preferred in the range of 1100 to 1500 $g/m^2$, e.g. in the range of 1100 to 1300 $g/m^2$, such as about 1100 $g/m^2$. Surface weight is measured herein according to EN 12127.

The textile fabric preferably comprises high temperature resistant fibers, i.e. having a glass transition temperature of more than 200 °C, such as more than 500 °C, even more than 800 °C.

According to some embodiments, the textile fabric may comprise glass fibers.

As an example, the textile fabric comprises fibers selected from the group consisting of E glass fibers, C glass fibers, S glass fibers, silica fibers, ceramic fibers, and organic fibers, such as PE or PET fibers.

The fibers of the textile fabric may even comprise only glass fibers.

The fibers may have a diameter in the range of 5 to 20 μm, such as in the range of 6 to 20 μm, more preferably in the range of 9 to 13 μm, such as in the range of 9 to 11 μm. The fibers preferably may be staple fibers with an average length of less than 15 mm, and preferably about 10 mm. The fibers preferably may have a maximum length of less than 15 mm, and preferably about 10 mm.

Suitable textile fabric layers are based on glass fiber needle felts F01, F21 and F40 of JSC Valmiera Glass Fiber, Latvia.

The textile fabric layer preferably contains a binder, in particular when being a nonwoven layer, which binder content is preferably less than 10% w, most preferably from 1 to 3% w. This % w is expressed over the total weight of the textile fabric layer. Examples of suitable binders include functional silanes such Dynasylan commercially available from Evonik, tetraethylorthosilicate (TEOS), water glass, silicone, siloxane, colloidal silica and acrylics.

The benefit of adding a binder is that dust formation is further reduced and that it is easier to inject the fumed silica into the textile fabric layer.

A thermal insulating fabric according to the invention generally has a thermal conductivity in the range 35 to 50 mW/m*K. This thermal conductivity is the thermal conductivity at 300 °C, measured according to ASTM C177.

A product is understood thermally insulating when it has a thermal conductivity of less than 50 mW/m*K.

The thermally insulating fabrics according to the invention are still flexible while releasing less to no dust during installation and/or use. The fabric is substantially noncombustible and may have a thickness up to 25 mm, even up to 50 mm thick.

The textile fabric layer of the thermally insulating fabric according to the invention is filled with fumed silica preferably making use of the technique as described in EP 3023528A1, hereby incorporated in its entirety by reference. By means of hollow needles, the fumed silica powder, in suspension in a solvent, e.g. hexane, is injected in the textile fabric, after which the solvent is removed from the textile fabric, leaving the fumed silica powder in the textile fabric.

Alternatively the textile fabric layer may be filled with fumed silica by dipping techniques, or by applying electrical charges to impregnate the fabric layer with the fumed silica powder or by layered composite method wherein composites are formed by a sandwich technique of a layer of fumed silica powder between textile fabric layers interlocked by stiches or hot rolling.

The thermally insulating fabric of the present invention can further be provided with a first and/or a second outer textile layer laminated to the fumed silica containing textile fabric layer, said first outer textile layer preferably having an air permeability of less than or equal to 40 cc/sec*5 cm$^2$, said second outer textile layer preferably having air permeability of less than or equal to 40 cc/sec*5 cm$^2$.

The air permeability is measured using any suitable apparatus, measuring the volume of air passing through a surface of a sample at 98 Pascal pressure drop between the surfaces of the sample, typically using a circular surface of 25 mm diameter.

More preferably the air permeability of the first and/or second outer textile layer is less than or equal to 35 cc/sec*5 cm$^2$, such as less than or equal to 20 cc/sec*5 cm$^2$ or even less than or equal to 5 cc/sec*5 cm$^2$.

According to some embodiments, the first and/or the second outer textile layer may have a thickness in the range of 0.05 to 3 mm. According to some embodiments, the first outer textile layer may have a thickness in the range of 0.05 to 3 mm. According to some embodiments, the second outer textile layer may have a thickness in the range of 0.05 to 3 mm.

The first and/or the second outer textile layer may have a thickness in the range of 0.1 to 3 mm, such as in the range of 0.1 to 0.5 mm, more preferred in the range of 0.2 to 0.3 mm.

Optionally the thickness of the first and the second outer textile layer are identical.

According to some embodiments, the first and/or the second outer textile layer may have a density in the range of 3 to 1300 kg/m$^3$. According to some embodiments, the first outer textile layer has a density in the range of 3 to 1300 kg/m$^3$. According to some embodiments, the second outer textile layer has a density in the range of 3 to 1300 kg/m$^3$. Optionally the density of the first and the second outer textile layer are identical.

According to some embodiments, the first and/or the second outer textile layer may have a surface weight of 10 to 30 g/m$^2$. According to some embodiments, the first outer textile layer may have a surface weight of 10 to 30 g/m$^2$. According to some embodiments, the second outer textile layer may have a surface weight of 10 to 30 g/m$^2$.

The first and/or the second outer textile layer may have a surface weight of 15 to 25 g/m$^2$, more preferred in the range of 17 to 21 g/m$^2$. Optionally the surface weight of the first and the second outer textile layer are identical.

The first and second outer layers are textile layers, i.e. they should be pliable around a tubular object having a bending radius of 1.5 inch (3.81 cm) or less.

The fibers of the first and the second outer layer may be selected from the group consisting of E glass fibers, C glass fibers, S glass fibers, silica fibers, ceramic fibers, and organic fibers, preferably PE or PET fibers.

The fibers used for the first and second layer may have a diameter in the range of 5 to 20 μm, such as in the range of 6 to 20 μm, more preferably in the range of 9 to 13 μm, such as in the range of 9 to 11 μm. The fibers preferably may be staple fibers with an average length of less than 15 mm, and preferably about 10 mm. The fibers preferably may have a maximum length of less than 15 mm, and preferably about 10 mm.

The first and the second layer may comprise high temperature resistant fibers, i.e. having a glass transition temperature of more than 200 °C, such as more than 500 °C, even more than 800 °C.

According to some embodiments, the first and/or second outer textile layer may comprise glass fibers.

The fibers of the first and/or second outer textile layer may even comprise only glass fibers.

Optionally the fibers of the first and the second outer textile layer and/or the fumed silica containing textile fabric layer are provided out of identical material, such as either E glass fibers, C glass fibers, S glass fibers, silica fibers or ceramic fibers.

The first and/or second outer layer preferably have a binder content, in particularly when being a nonwoven layer, which binder content is preferably less than 15% w, most preferably less than 12% w, typically 10 toll % w. This % w is expressed over the total weight of the outer layer. The preferred binder is polyvinylalcohol (PVA) binder.

The first and/or second outer layer preferably have a tensile strength in machine direction (MD) and cross direction (CD) in the range of 20 to 100 N/5 cm, measured according to ISO1924/2.

The first and/or second outer textile layer is generally provided with an adhesive in order to be able to laminate the layers to the textile fabric layer. The preferred adhesive is a hot melt adhesive. Preferred adhesives are polyamide, polypropylene or thermally setting polyurethane based adhesives. The adhesive may be applied as a coating to the first and/or second layer. In an alternative, a film of adhesive, such as a hot melt adhesive, may be applied between the first and/or second outer layer, and the textile fabric layer. An adhesive, optionally applied as a coating, in an amount of 4 to 20 g/m$^2$ is preferred, more preferred in an amount of 4 to 10 g/m$^2$, such as about 8 g/m$^2$. Preferably this adhesive is applied on only one side of the first and second layer. The side being provided with adhesive is used to contact the textile fabric matrix.

The first and second layer and textile fabric layer may be laminated to each other by thermal or solvent lamination. Most preferred, the layers are laminated to each other using thermal or heat lamination, e.g. in a calendering. The first outer textile layer may comprise a woven, nonwoven, kitted or braided textile fabric.

The second outer textile layer may comprise a woven, nonwoven, kitted (both warp or weft knitted fabrics) or braided textile fabric.

The woven first and/or second outer layer may be plain woven textile fabrics, twill woven textile fabrics, satin woven textile fabrics, atlas or basket woven textile fabrics, or alike.

According to some embodiments, the first and second outer textile layer may be identical.

According to some embodiments, the first outer textile layer may comprise a nonwoven textile fabric.

According to some embodiments, the first outer textile layer may have a density in the range of 3 to 300 kg/m$^3$. According to some embodiments, the first outer textile layer may have a surface weight of 10 to 30 g/m$^2$.

Optionally the second outer textile layer comprises a nonwoven textile fabric. Optionally the nonwoven textile fabric of the first and the second outer textile layer are identical.

According to some embodiments, the second outer textile layer may be a woven textile layer. According to some embodiments, the second outer textile layer may have a density in the range of 300 to 1300 kg/m$^3$. According to some embodiments, the second outer textile layer may have a surface weight of 100 to 300 g/m$^2$.

Suitable first and second outer textile layers, also being referred to as veils, are layers provided as fleeces AD-stick E2016.4, available from ADLEY NV, Belgium. Other suitable veils are the Optiveil™ series of veils of Technical Fibre Products Ltd, UK, such as 20103A Eglass veils, with area weight of 10 g/m$^2$, 17 g/m$^2$, 22 g/m$^2$, 30 g/m$^2$ or 34 g/m$^2$.

According to a second aspect of the invention, the thermally insulating fabrics are used as thermal insulation.

The fabrics may be used to thermally insulate product for various applications such as pipes and building applications. The pipes may be used for the oil sector where temperature applications will be within 200 to 800 °C. Fabrics according to the invention may be used in cryogenic applications with temperature limits of less than 10 °C. The fabrics may be used in the building sector for e.g. roofing, ceiling and floor applications where mineral wools, polystyrene (PS), or polyurethane (PU) shortfalls in performance in thermal insulation properties.

When used to cover e.g. a tubular pipe by bending the fabric around the outer surface of said tube, e.g. a tube of 1 m diameter, little to no dust is released. The textile layers remain undamaged and do not show cracks.

Example 1

Thermally insulating fabrics according to the invention are prepared as follows. A mix of 7 kg of hydrophobic fumed silica (Aerosil R974) with 185 I of hexane and SiC (6% by weight based on the fumed silica) is injected in a suitable textile fabric matrix Kobemat EGL of 10 mm thick and 110 kg/m$^3$ in density (Kobe 110 density). The injection was monitored so as to obtain a homogeneous distribution of the mix inside the textile fabric matrix to achieve optimum results. The injection and mixing techniques are, for example, disclosed in US 2018/0099478.

Various types of textile fabrics varying in density were examined, the table below (Table 1) presents the collected data for the change of matrix density and their effect on the final properties of the thermally insulating fabric injected with same amount of mix (about 1 kg).

TABLE 1

| Matrix type | Matrix thickness (mm) | Mix type | Blanket density (kg/m$^3$) | Thermal conductivity at mean 300° C. (mW/mK) |
|---|---|---|---|---|
| Kobe 110 density | 10 | None | 110 | 71 |
| Kobe 110 density | 10 | R974 + 6% SiC | 190 | 42 |
| Kobe 120 density | 10 | R974 + 6% SiC | 200 | 44 |
| Kobe 130 density | 10 | R974 + 6% SiC | 210 | 47 |

Example 2

Thermally insulating fabrics were made as per Example 1. Various amounts of SiC were added to the mix of fumed silica and hexane. The effect of IR opacifier and its amount on the final product are presented in Table 2 below.

TABLE 2

| Matrix type | Matrix thickness (mm) | Mix type | Blanket density (kg/m$^3$) | Thermal conductivity at mean 300° C. (mW/mK) |
|---|---|---|---|---|
| Kobe 110 density | 10 | None | 110 | 71 |
| Kobe 110 density | 10 | R974 | 160 | 48 |
| Kobe 110 density | 10 | R974 + 6% SiC | 190 | 42 |
| Kobe 110 density | 10 | R974 + 15% SiC | 210 | 55 |

Example 3

Thermally insulating fabrics were made as per Example 1. Another set of results presented in the table below relates to the effect of the amount of mix injected into the textile fabric matrix on the final product.

TABLE 3

| Matrix type | Matrix thickness (mm) | Mix type | Amount of mix injection ($g/m^2$) | Blanket density ($kg/m^3$) | Thermal conductivity at mean 300° C. (mW/mK) |
|---|---|---|---|---|---|
| Kobe 110 density | 10 | None | None | 110 | 71 |
| Kobe 110 density | 10 | R974 + 6% SiC | 400 | 150 | 60 |
| Kobe 110 density | 10 | R974 + 6% SiC | 800 | 190 | 45 |
| Kobe 110 density | 10 | R974 + 6% SiC | 1000 | 220 | 40 |

Example 4

Thermally insulating fabrics were made as per Example 1.

The table below highlights some of the results gathered in comparing the use of fumed silica versus aerogel (AEROVA™ aerogel, available from Jios Corporation) injection using the same amount of mix injection and the same textile fabric matrix.

These results show that a higher temperature the use of fumed silica instead of aerogel provides a thermally insulating fabric with improved insulation properties. Further dust development is reduced in the case of fumed silica.

TABLE 4

| Matrix type | Matrix thickness (mm) | Mix type | Amount of mix injection ($g/m^2$) | Blanket density ($kg/m^3$) | Thermal conductivity at mean 300° C. (mW/mK) |
|---|---|---|---|---|---|
| Kobe 110 density | 10 | None | None | 110 | 71 |
| Kobe 110 density | 10 | R974 + 6% SiC | 1000 | 220 | 40 |
| Kobe 110 density | 10 | Aerogel + 6% SiC | 1000 | 220 | 41 |

It is to be understood that although preferred embodiments and/or materials have been discussed for providing embodiments according to the present invention, various modifications or changes may be made without departing from the scope and spirit of this invention.

The invention claimed is:

1. A thermally insulating textile fabric layer, which comprises an injected mix of a hydrophobic fumed silica powder of average pore size 50 to 200 nm in an amount range of 40 to 50% w based on the weight of the textile fabric layer in which the hydrophobic fumed silica is present, impregnated into said textile fabric layer, and infrared opacifiers, wherein an amount of said infrared opacifiers is in the range 3 to 7% w, the % w based upon the weight of the fumed silica present, wherein the textile fabric layer is a glass fiber needle felt being a flexible material composed of a network of fibers.

2. Thermally insulating textile fabric layer according to claim 1, wherein the average pore size of the fumed silica is between 50 and 100 nm.

3. Thermally insulating textile fabric layer according to claim 1, wherein the hydrophobic fumed silica has a silane content of 1 to 5% w, the % w based upon the total weight of the fumed silica powder.

4. Thermally insulating textile fabric layer according to claim 1, wherein the textile fabric layer has a thickness in the range 10 to 20 mm.

5. Thermally insulating textile fabric layer according to claim 1, wherein the textile fabric layer comprises high temperature resistant fibers having a glass transition temperature of more than 200 °C.

6. Thermally insulating textile fabric layer according to claim 1 additionally comprising a binder, wherein the amount of said binder does not exceed 10% w, the w % being expressed over the total weight of the textile fabric layer, and wherein the binder is selected from the group consisting of functional silanes, tetraethylorthosilicate, water glass, silicone, siloxane, colloidal silica, acrylics, and mixtures thereof.

7. Thermally insulating textile fabric layer according to claim 1, having a thermal conductivity of less than 50 mW/mK at 300 °C.

8. Thermally insulating textile fabric layer according to claim 1, wherein said textile fabric layer is provided on one or both sides with a first outer textile layer and/or a second outer textile layer.

9. Thermally insulating textile fabric layer according to claim 1, which is pliable around a tubular object having a bending radius of <3.81 cm.

10. Thermally insulating fabric layer according to claim 8, wherein both said first and second outer textile layers have an air permeability of <40 cc/sec*5 $cm^2$.

11. Thermally insulating fabric layer according to claim 8, wherein all said layers are laminated together.

12. Thermally insulating fabric layer according to claim 1, wherein the infrared opacifier is silicon carbide.

13. Thermally insulating fabric layer according to claim 1, wherein the glass fiber needle felt has a surface weight of 1000 to 1800 $g/m^2$.

14. A thermally insulating fabric comprising a textile fabric layer which comprises an injected mix of:

a hydrophobic fumed silica powder of average pore size 50 to 200 nm in an amount range of 40 to 50% w based on the weight of the textile fabric layer in which the hydrophobic fumed silica is present, impregnated into said textile fabric layer, and infrared opacifiers, wherein the infrared opacifier is silicon carbide, wherein an amount of said infrared opacifiers is in the range of 3% w to 7% w based upon the weight of the hydrophobic fumed silica present, wherein the textile fabric layer is composed of a network of fibers and has a surface weight in the range of 1000 to 1800 $g/m^2$.

15. The thermally insulating fabric of claim 14, wherein the textile fabric layer has a thickness in the range 10 to 20 mm, wherein said textile fabric layer is provided on both sides with a first outer textile layer and/or a second outer textile layer respectively, which first and second outer layers are laminated to the fumed silica containing textile fabric layer, wherein said first and second outer textile layer each have a thickness in the range of 0.1 to 0.5 mm.

16. Thermal insulation comprising a thermally insulating textile fabric layer, a first outer textile layer and a second outer textile layer, which first and second outer layers are laminated to the textile fabric layer, wherein the textile fabric layer has a thickness in the range 10 to 20 mm, wherein said first and second outer textile layer each have a thickness in the range of 0.1 to 0.5 mm, wherein the textile fabric layer is a glass fiber needle felt, which textile fabric layer comprises an injected mix of a hydrophobic fumed silica powder of average pore size 50 to 200 nm in an amount range of 40 to 50% w based on the weight of the textile fabric layer in which the hydrophobic fumed silica is present, impregnated into said textile fabric layer, and infrared opacifiers, wherein the infrared opacifier is silicon carbide, which is present in an amount in the range 3 to 7% w, the % w based upon the weight of the fumed silica present.

* * * * *